(12) United States Patent
Liang et al.

(10) Patent No.: US 12,422,687 B1
(45) Date of Patent: Sep. 23, 2025

(54) HEAD-MOUNTED DISPLAY DEVICE AND DISPLAY SYSTEM

(71) Applicants: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Yuan-Ting Liang, Hsinchu (TW); Ying-Hung Tsai, Hsinchu (TW)

(73) Assignees: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

( * ) Notice: Subject to any disclaimer, the term of this patent is extended or adjusted under 35 U.S.C. 154(b) by 0 days.

(21) Appl. No.: 18/666,609

(22) Filed: May 16, 2024

(30) Foreign Application Priority Data

Mar. 19, 2024 (CN) .......................... 202420535056.6

(51) Int. Cl.
*G06F 3/00* (2006.01)
*G02B 5/20* (2006.01)
(Continued)

(52) U.S. Cl.
CPC .......... *G02B 27/0176* (2013.01); *G02B 5/208* (2013.01); *G02B 27/0172* (2013.01);
(Continued)

(58) Field of Classification Search
CPC ...... A61B 17/3498; A61B 2017/00867; A61B 2017/00871; A61B 2017/2932; A61B 17/30; A61B 2017/00345; B82Y 30/00; C08G 18/08; C08G 18/3203; C08G 18/3221; C08G 18/3271; C08G 18/3281; C08G 18/3284; C08G 18/3287; C08G 18/3851; C08G 18/73; C08G 2280/00; C08G 18/302; C08G 18/8025; C08G 2101/00; C08G 18/165; C08G 18/18; C08G 18/246; C08G 18/8041; C08G 2110/005;
(Continued)

(56) References Cited

U.S. PATENT DOCUMENTS

2006/0133757 A1\* 6/2006 Nunnink ............ G06K 7/10881
385/133
2008/0146909 A1\* 6/2008 Abbink ..................... G01J 1/08
600/407

\* cited by examiner

*Primary Examiner* — Insa Sadio
(74) *Attorney, Agent, or Firm* — ScienBiziP, P.C.

(57) ABSTRACT

A head-mounted display device is provided, comprising a device body, an optical waveguide lens, an optical component, and one or more video component. The optical waveguide lens and the one or more video component are relatively arranged, the optical waveguide lens and the one or more video component are arranged in the device body, the optical component is detachably installed on the device body, the optical component is arranged on a side of the optical waveguide lens away from the one or more video component, the video component comprises a video sensing element and an infrared light filter, the video sensing element is arranged at a sider of the optical waveguide lens away the optical component, the infrared light filter is movably arranged on a side of the video sensing element away from the optical waveguide lens. A display system is also provided.

20 Claims, 6 Drawing Sheets

(51) Int. Cl.
   *G02B 27/01*       (2006.01)
   *G02B 27/09*       (2006.01)
(52) U.S. Cl.
   CPC .. *G02B 27/0955* (2013.01); *G02B 2027/0138* (2013.01); *G02B 2027/0154* (2013.01); *G02B 2027/0178* (2013.01)
(58) Field of Classification Search
   CPC ............... C08J 9/0085; C08J 2201/026; C08J 2205/05; C08J 2375/04; C08J 9/146; C08J 2203/162; C08J 2203/142; C08J 2300/24; C08L 75/04; C08L 75/12; C08L 75/14; A61M 2205/0266; A61M 2039/244; A61M 39/24; A61M 2039/2426; A61M 2039/2446
   See application file for complete search history.

HEAD-MOUNTED DISPLAY DEVICE AND DISPLAY SYSTEM

FIELD

The present disclosure relates to fields of head-mounted display device technology, particularly to a head-mounted display device and a display system.

BACKGROUND

In prior art, a head-mounted display device mainly includes Augmented Reality (AR) glasses, mixed Reality (MR) glasses and Virtual Reality (VR) glasses. The AR glasses can integrate real world information and virtual world information, and the AR glasses can superimpose virtual objects onto real scenes. The MR glasses can display the virtue world information or virtue objects in the real world and can interact with users. The VR glasses combine simulation technology and multimedia sensing technology to generate a simulated environment, and users enjoy the simulated environment.

However, when the users wear the head-mounted display device, an ambient brightness may be too low or too bright, the users cannot see surrounding objects, and a user's experience may be affected.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of one embodiment described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein comprises any and all combinations of one or more of associated listed items.

Some embodiments of the present application are described in detail. In the case of no conflict, the following embodiments and the features in one embodiment can be combined with each other.

Referring to FIG. 1, FIG. 2, FIG. 3, FIG. 4, and FIG. 5, the present application discloses a head-mounted display device 100.

Figure 1:
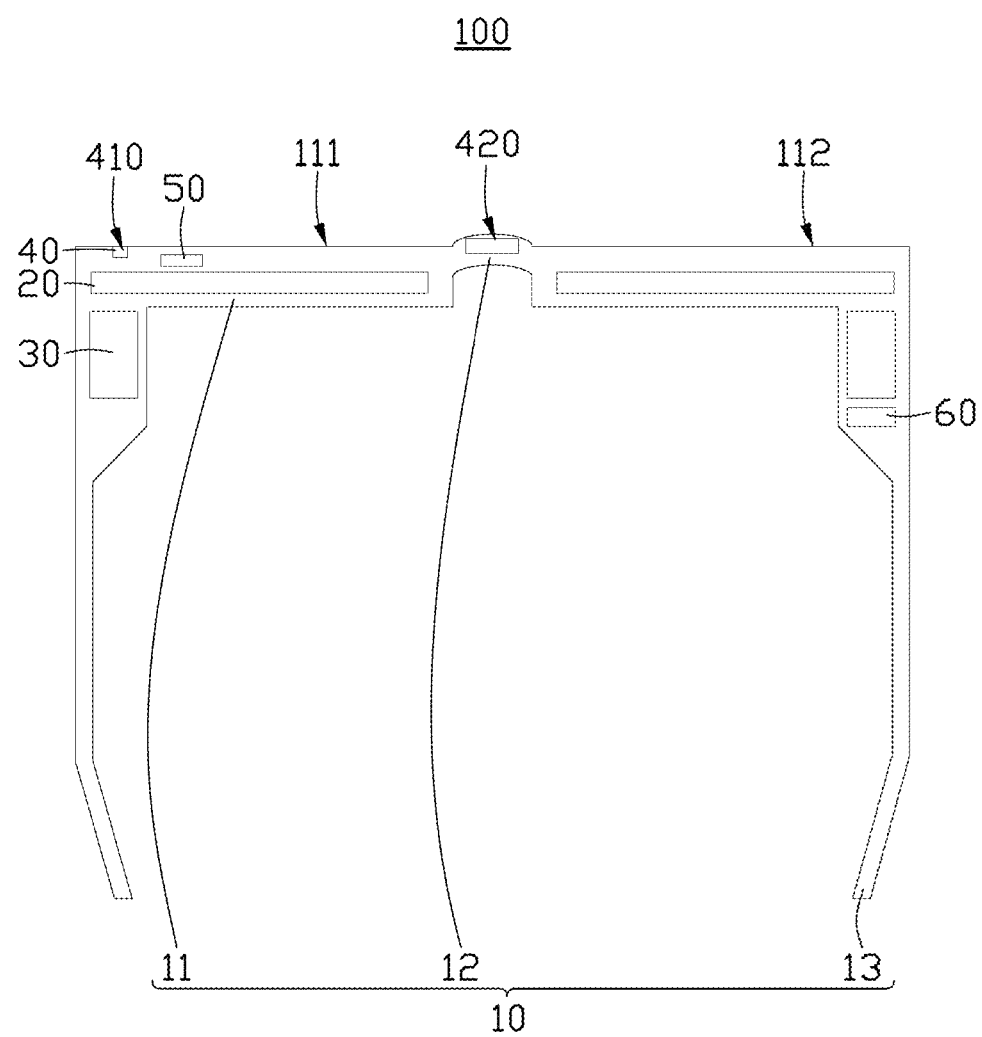
FIG. 1 illustrates a schematic view of a head-mounted display device in an embodiment of the present disclosure.
Figure 2:
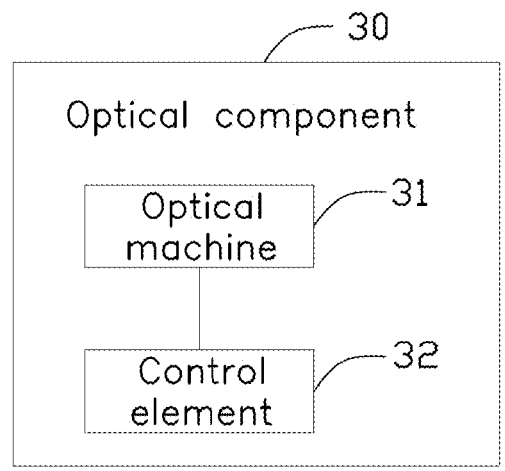
FIG. 2 illustrates a schematic view of an optical component of the head-mounted display device shown in FIG. 1.
Figure 3:
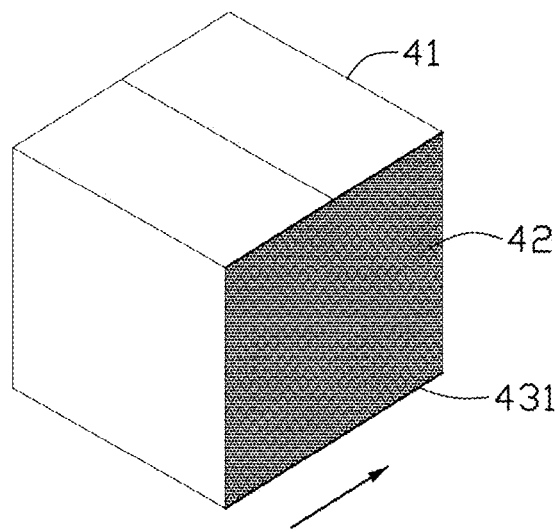
FIG. 3 illustrates schematic view of a connection structure of a video component of the head-mounted display device shown in FIG. 1.

Referring to FIG. 1, FIG. 2, and FIG. 3, in one embodiment, the head-mounted display device 100 includes a device body 10, an optical waveguide lens 20, an optical component 30, and one or more video component 40. The optical waveguide lens 20 is disposed opposite to the video component 40, the optical waveguide lens 20 and the one or more video component 40 are arranged in the device body 10, the optical component 30 is detachably installed on the device body 10, the optical component 30 is arranged on a side of the optical waveguide lens 20 near a user. Each of the video component 40 includes a video sensing element 41 and an infrared light filter 42, the video sensing element 41 is arranged at a side of the optical waveguide lens 20 away from the user, the infrared light filter 42 is movably arranged on a side of the video sensing element 41 away from the optical waveguide lens 20.

In one embodiment, the video sensing element 41 may be a video sensing chip, the video sensing chip may be a Charge Coupled Device, or a Complementary Metal-Oxide Semiconductor. A frequency response length range of the video sensing chip is in a range between 400 nm-1000 nm.

The video sensing element 41 and the infrared light filter 42 are arranged on a side of the optical waveguide lens 20 near an external environment. When the ambient brightness is too low or too dim, the infrared light filter 42 is removed from the video sensing element 41, and the video sensing element 41 can use infrared light to receive clear video of surroundings. Then, the optical component 30 acquires video of the video sensing element 41 and transmits the video of the video sensing element 41 to the optical waveguide lens 20, and the optical waveguide lens 20 projects the video of the video sensing element 41 to the user's eyeball.

When the ambient brightness is too high, the infrared light filter 42 is moved to attach to the video sensing element 41, the infrared light filter 42 can filter out the infrared light to assist the video sensing element 41 to obtain the video of surroundings. Then, the optical component 30 acquires the video of the video sensing element 41 and transmits the video of the video sensing element 41 to the optical waveguide lens 20, and the optical waveguide lens 20 projects the video of the video sensing element 41 to the user's eyeball.

In the head-mounted display device 100, the infrared light filter 42 is movably arranged on the side of the video sensing element 41 away from the optical waveguide lens 20. When the ambient brightness is too low or too dim, the infrared light filter 42 is removed from the video sensing element 41, and the video sensing element 41 can use infrared light, and the infrared light filter 42 assists the video sensing element 41 to receive the clear video of surroundings. Conversely, the infrared light filter 42 is moved to attach to the video sensing element 41, the infrared light filter 42 can filter out the infrared light to assist the video sensing element 41 to obtain the video of surroundings. The head-mounted display device 100 has a simple design and low cost.

In one embodiment, the optical waveguide lens 20 can be a reflective design, a surface relief grating design, or a total light grating design.

In some embodiments, the device body 10 includes a glasses frame 11, a nose bridge frame 12, and two support legs 13. The nose bridge frame 12 is arranged in a middle portion of the glasses frame 11, the video component 40 is arranged in the glasses frame 11 or the nose bridge frame 12. In other embodiment, the video component 40 is arranged in the glasses frame 11 and the nose bridge frame 12.

In one embodiment, a number of the video component 40 can be one or two. When the number of the video component 40 is one, the video component 40 is arranged in the glasses frame 11 or the nose bridge frame 12. When the number of the video component 40 is two, one is arranged in the glasses frame 11, and the other is arranged in the nose bridge frame 12.

In one embodiment, the video sensing element 41 and the infrared light filter 42 can be arranged in the glasses frame 11. In one embodiment, the glasses frame 11 includes a first frame 111 and a second frame 112, the first frame 111 and the second frame 112 are respectively connected to opposite ends of the nose bridge frame 12, when the number of the video component 40 is one, the video component 40 is arranged in the first frame 111 or the second frame 112.

In another embodiment, when the number of the video component 40 is two, the video component 40 includes a first video component 410 and a second video component 420, the first video component 410 includes the video sensing element 41 and the infrared light filter 42, the second video component 420 also includes the video sensing element 41 and the infrared light filter 42. The first video component 410 is arranged in the first frame 111, the second video component 420 is arranged in the second frame 112.

In one embodiment, the optical component 30 is arranged on a side of the glasses frame 11 away from the nose bridge frame 12. The optical component 30 includes an optical machine 31 and a control element 32, the optical machine 31 is coupled to the control element 32, the optical machine 31 and the control element 32 are arranged at a side of the glasses frame 11 away from the nose bridge frame 12. The control element 32 projects the video output by the video component 40 to the optical machine 31 onto the optical waveguide lens 20. In one embodiment, the optical machine 31 can be a Liquid Crystal on Silicon (LCOS) panel. The optical machine 31 can be arranged in the glasses frame 11, one or two support legs 13, or the nose bridge frame 12.

In some embodiments, the head-mounted display device 100 includes a light source element 50 and a power supply element 60. The light source element 50 is arranged in the glasses frame 11 or the nose bridge frame 12, the control element 32 is communicated with the light source element 50. The power supply element 60 is arranged in the device body 10, the power supply element 60 is coupled to the optical component 30, the video component 40, and the light source element 50.

In one embodiment, the light source element 50 is an infrared LED lamp. Luminous direction of the infrared LED lamp towards the front of the user, and a brightness of the infrared LED lamp is 1 mW-100 mW. One or more infrared LED lights can be provided in the glasses frame 11, or one or more infrared LED lights can be provided in the nose bridge frame 12, or one or more infrared LED lights can be provided in the glasses frame 11 and the nose bridge frame 12. The power supply element 60 can be a battery, and the power supply element 60 can be arranged in the glasses frame 11, the nose bridge frame 12, or one or two support legs 13.

The following details a connection structure between the video sensing element 41 and an infrared light filter 42.

In one embodiment, referring to FIG. 3, the video component 40 further includes first rail 431, the first rail 431 are arranged on opposite sides of the video sensing element 41, one end of the first rail 431 is connected to the glasses frame 11, second end of the first rail 431 is movably connected to the infrared light filter 42. A length of the first rail 431 is larger than a length of the video sensing element 41. When the video sensing element 41 senses a high ambient brightness, the control element 32 moves the infrared light filter 42 along the first rail 431 to attach to the video sensing element 41. When the video sensing element 41 senses a low ambient brightness, the control element 32 removes the infrared light filter 42 along the first rail 431 from the video sensing element 41.

Figure 4:
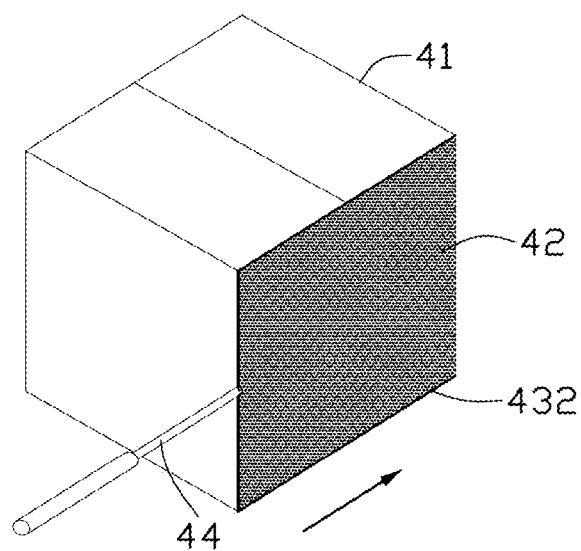
FIG. 4 illustrates schematic view of a connection structure of the video component of the head-mounted display device shown in FIG. 1.

In another embodiment, referring to FIG. 4, the video component 40 further includes a telescopic element 44 and a second rail 432, first end of the second rail 432 is movably connected to the infrared light filter 42, second end of the second rail 432 is connected to the telescopic element 44, a side of the telescopic element 44 away from the infrared light filter 42 is connected to the glasses frame 11, the telescopic element 44 drives the infrared light filter 42 to move toward to the video sensing element 41 under a control of the control element 32.

Figure 5:
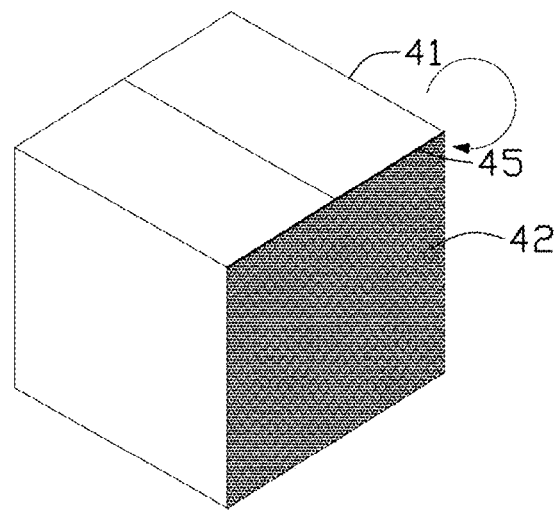
FIG. 5 illustrates another connection schematic view of the video component of the head-mounted display device shown in FIG. 1.

In another embodiment, referring to FIG. 5, the video component 40 further includes a rotating element 45, first end of the rotating element 45 is rotatably connected to the infrared light filter 42, second end of the rotating element 45 is connected to the glasses frame 11, the rotating element 45 drives the infrared light filter 42 to turn over the video sensing element 41 under a control of the control element 32.

An extension direction of the first rail 431, an extension direction of the second rail 432 and an extension direction of the rotating element 45 are light receiving paths of the video sensing element 41. When the ambient brightness is low or insufficient, the infrared light filter 42 follows the light receiving paths of the video sensing element 41 to remove.

In the head-mounted display device 100, the infrared light filter 42 can be moved towards or away from the video sensing element 41 along light receiving path. When the ambient brightness is too high, the infrared light filter 42 is moved to attach to the video sensing element 41, the infrared light filter 42 can filter out the infrared light to assist the video sensing element 41 to obtain the video of surroundings. Then, the optical component 30 acquires video of the video sensing element 41 and transmits the video of the video sensing element 41 to the optical waveguide lens 20, and the optical waveguide lens 20 projects the video of the video sensing element 41 to the user's eyeball. The light source element 50 provides illumination to the surrounding environment, and the power supply element 60 provides power to the optical component 30, the video component 40, and light source element 50. When the ambient brightness is too low or too dim, the infrared light filter 42 is removed from the video sensing element 41 along the light receiving paths, and the video sensing element 41 can use infrared light to receive clear video of surroundings.

Figure 6:
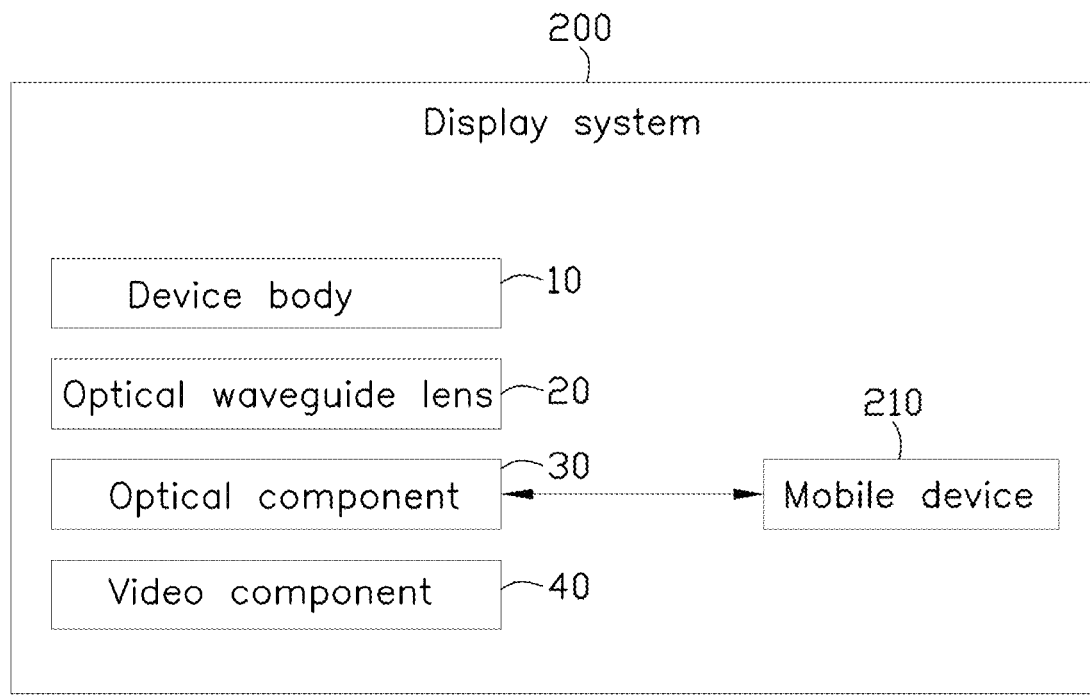
FIG. 6 illustrates a diagram of a display system in an embodiment of the present disclosure.

Referring to FIG. 6, one embodiment of the present application discloses a display system 200. The display system 200 includes the head-mounted display device 100 as described above and a mobile device 210. The mobile device 210 is communicated with the optical component 30, the mobile device 210 is configured to change a video of the optical component 30 of the head-mounted display device 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A head-mounted display device comprising:
   a device body,
   an optical waveguide lens,
   an optical component, and
   one or more video component, wherein the optical waveguide lens is disposed opposite to the one or more video component, the optical waveguide lens and the one or more video component are arranged in the device body, the optical component is detachably installed on the device body, the optical component is arranged on a side of the optical waveguide lens away from the one or more video component, each of the video component comprises a video sensing element and an infrared light filter, the video sensing element is arranged at a side of the optical waveguide lens away from the optical component, the infrared light filter is movably arranged on a side of the video sensing element away from the optical waveguide lens.

2. The head-mounted display device as claimed in claim 1, wherein the device body comprises a glasses frame and a nose bridge frame, the nose bridge frame is arranged in a middle portion of the glasses frame, the video component is arranged in the glasses frame or in the nose bridge frame.

3. The head-mounted display device as claimed in claim 2, wherein the one or more optical component comprises an optical machine and a control element, the optical machine and the control element are arranged at a side of the glasses frame away from the nose bridge frame, the optical machine is coupled to the control element, the video component outputs a video to the optical machine, and the control element projects the video output onto the optical waveguide lens.

4. The head-mounted display device as claimed in claim 3, wherein each of the one or more video component further comprises a first rail, the first rail is arranged on opposite sides of the video sensing element, one end of the first rail is connected to the glasses frame, a second end of the first rail is movably connected to the infrared light filter.

5. The head-mounted display device as claimed in claim 3, wherein each of the one or more video component further comprises a telescopic element and a second rail, a first end of the second rail is movably connected to the infrared light filter, a second end of the second rail is connected to the telescopic element, a side of the telescopic element away from the infrared light filter is connected to the glasses frame, the telescopic element drives the infrared light filter to move toward to the video sensing element under a control of the control element.

6. The head-mounted display device as claimed in claim 3, wherein each of the one or more video component further comprises a rotating element, a first end of the rotating element is rotatably connected to the infrared light filter, a second end of the rotating element is connected to the glasses frame, the rotating element drives the infrared light filter to turn over the video sensing element under a control of the control element.

7. The head-mounted display device as claimed in claim 3, further comprising a light source element, wherein the light source element is arranged in the glasses frame or the nose bridge frame, the control element communicates with the light source element.

8. The head-mounted display device as claimed in claim 7, further comprising a power supply element, wherein the power supply element is arranged in the device body, the power supply element is coupled to the optical component, the video component, and the light source element.

9. The head-mounted display device as claimed in claim 2, wherein the device body further comprises two support legs, the optical component is detachably connected to the two support legs.

10. The head-mounted display device as claimed in claim 2, wherein the glasses frame comprises a first frame and a second frame, the first frame and the second frame are respectively connected to opposite ends of the nose bridge frame, the video component is arranged in the first frame or the second frame.

11. The head-mounted display device as claimed in claim 2, wherein the glasses frame comprises a first frame and a second frame, the first frame and the second frame are respectively connected to opposite ends of the nose bridge frame, the video components comprises a first video component and a second video component, the first video component is arranged in the first frame, the second video component is arranged in the second frame.

12. The head-mounted display device as claimed in claim 2, wherein the video component comprises a first video component and a second video component, the first video component is arranged in the glasses frame, the second video component is arranged in the nose bridge frame.

13. A display system comprising:
    a device body,
    an optical waveguide lens,
    an optical component,
    one or more video component, and
    a mobile device, wherein the optical waveguide lens is disposed opposite to the video component, the optical waveguide lens and the one or more video component are arranged in the device body, the optical component is detachably installed on the device body, the optical component is arranged on a side of the optical waveguide lens away from the one or more video component, each of the video component comprises a video sensing element and an infrared light filter, the video sensing element is arranged at a side of the optical waveguide lens away from the optical component, the infrared light filter is movably arranged on a side of the video sensing element away from the optical waveguide lens, the mobile device communicates with the optical component, the mobile device is configured to change a video of the optical component.

14. The display system as claimed in claim 13, wherein the device body comprises a glasses frame and a nose bridge frame, the nose bridge frame is arranged in a middle portion of the glasses frame, the video component is arranged in the glasses frame or the nose bridge frame.

15. The display system as claimed in claim 14, wherein the optical component comprises an optical machine and a control element, the optical machine and the control element are arranged at a side of the glasses frame away from the nose bridge frame, the optical machine is coupled to the control element, the video component outputs a video to the optical machine, and the control element projects the video output onto the optical waveguide lens.

16. The display system as claimed in claim 15, wherein each of the one or more video component further comprises first rail, the first rail is arranged on opposite sides of the video sensing element, one end of the first rail is connected to the glasses frame, a second end of the first rail is movably connected to the infrared light filter.

17. The display system as claimed in claim 15, wherein each of the one or more video component further comprises a telescopic element and a second rail, a first end of the second rail is movably connected to the infrared light filter, a second end of the second rail is connected to the telescopic element, a side of the telescopic element away from the infrared light filter is connected to the glasses frame, the telescopic element drives the infrared light filter to move toward to the video sensing element under a control of the control element.

18. The display system as claimed in claim 15, wherein each of the one or more video component further comprises a rotating element, a first end of the rotating element is rotatably connected to the infrared light filter, a second end of the rotating element is connected to the glasses frame, the rotating element drives the infrared light filter to turn over the video sensing element under a control of the control element.

19. The display system as claimed in claim 15, further comprising a light source element, wherein the light source element is arranged in the glasses frame or in the nose bridge frame, the control element communicates with the light source element.

20. The display system as claimed in claim 19, further comprising a power supply element, wherein the power supply element is arranged in the device body, the power supply element is coupled to the optical component, the video component, and the light source element.

* * * * *